Figure 3:
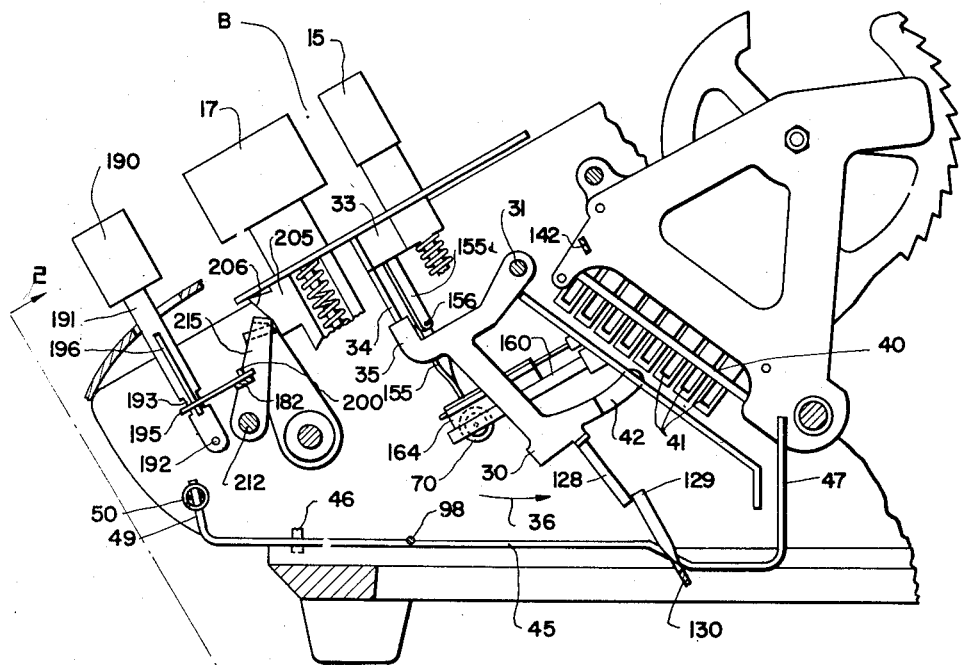

July 30, 1957  H. C. HALUSS  2,801,052
SQUARING AND ADD-SUBTRACT MECHANISM FOR CALCULATING MACHINES
Filed May 12, 1953  5 Sheets-Sheet 1
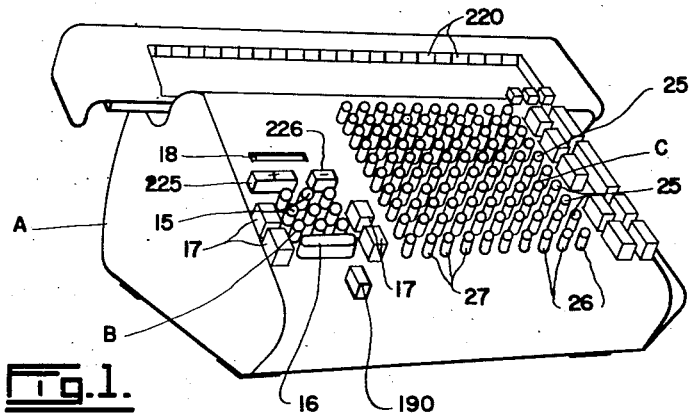
Fig.1.
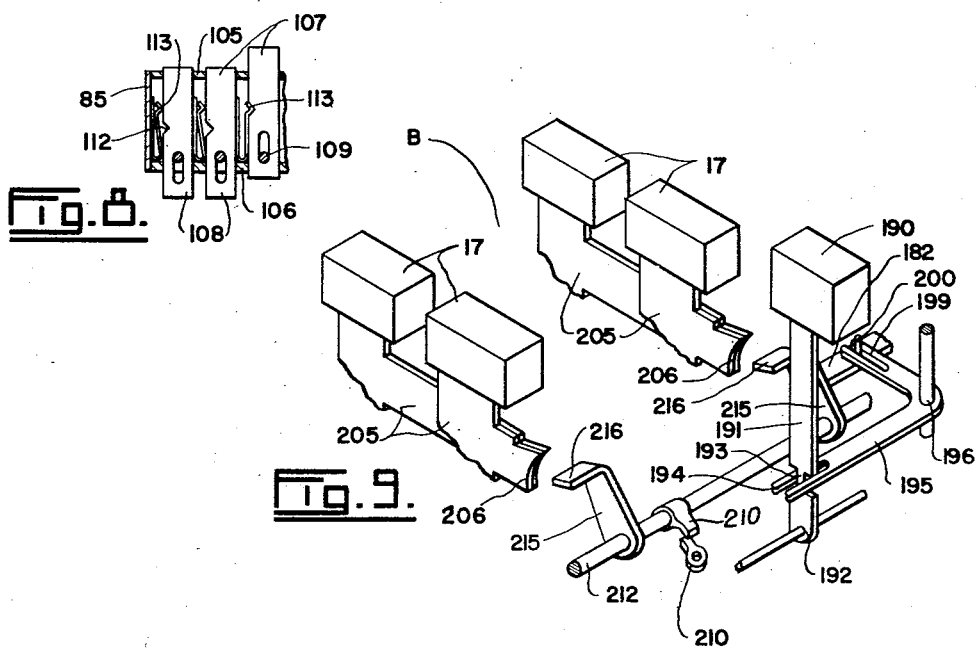
Fig.8.
Fig.9.
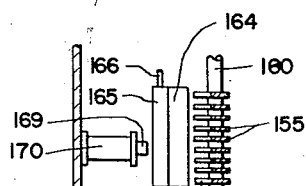
Fig.10.
INVENTOR
HANS CARL HALUSS
BY
Fetherstonhaugh & Co.
ATTORNEYS July 30, 1957     H. C. HALUSS     2,801,052
SQUARING AND ADD-SUBTRACT MECHANISM FOR CALCULATING MACHINES
Filed May 12, 1953     5 Sheets-Sheet 2
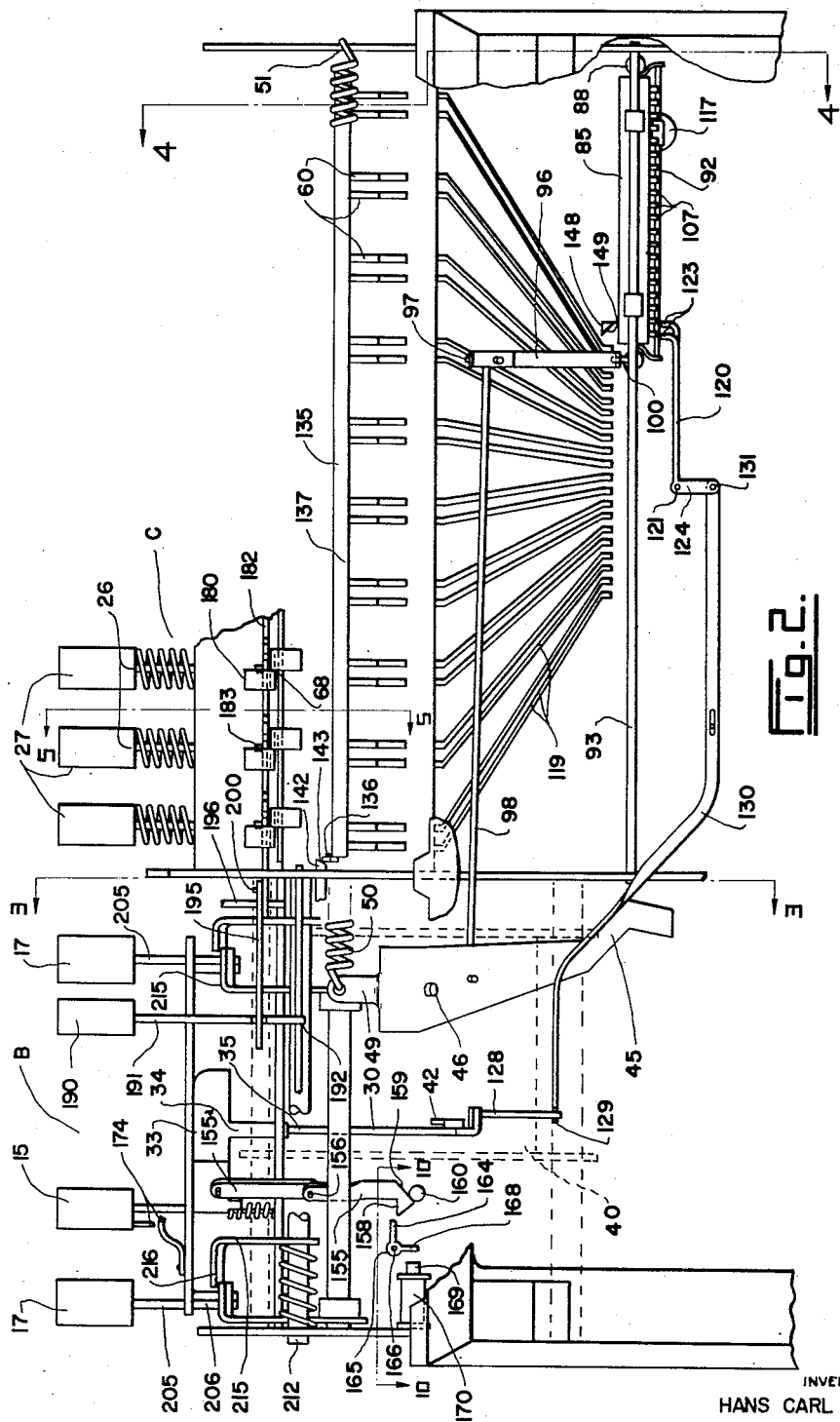
INVENTOR
HANS CARL HALUSS
BY
Fetherstonhaugh & Co.
ATTORNEYS July 30, 1957  H. C. HALUSS  2,801,052
SQUARING AND ADD-SUBTRACT MECHANISM FOR CALCULATING MACHINES
Filed May 12, 1953  5 Sheets-Sheet 3

INVENTOR
HANS CARL HALUSS
BY
Fetherstonhaugh & Co.
ATTORNEYS

July 30, 1957     H. C. HALUSS     2,801,052
SQUARING AND ADD-SUBTRACT MECHANISM FOR CALCULATING MACHINES
Filed May 12, 1953     5 Sheets-Sheet 4
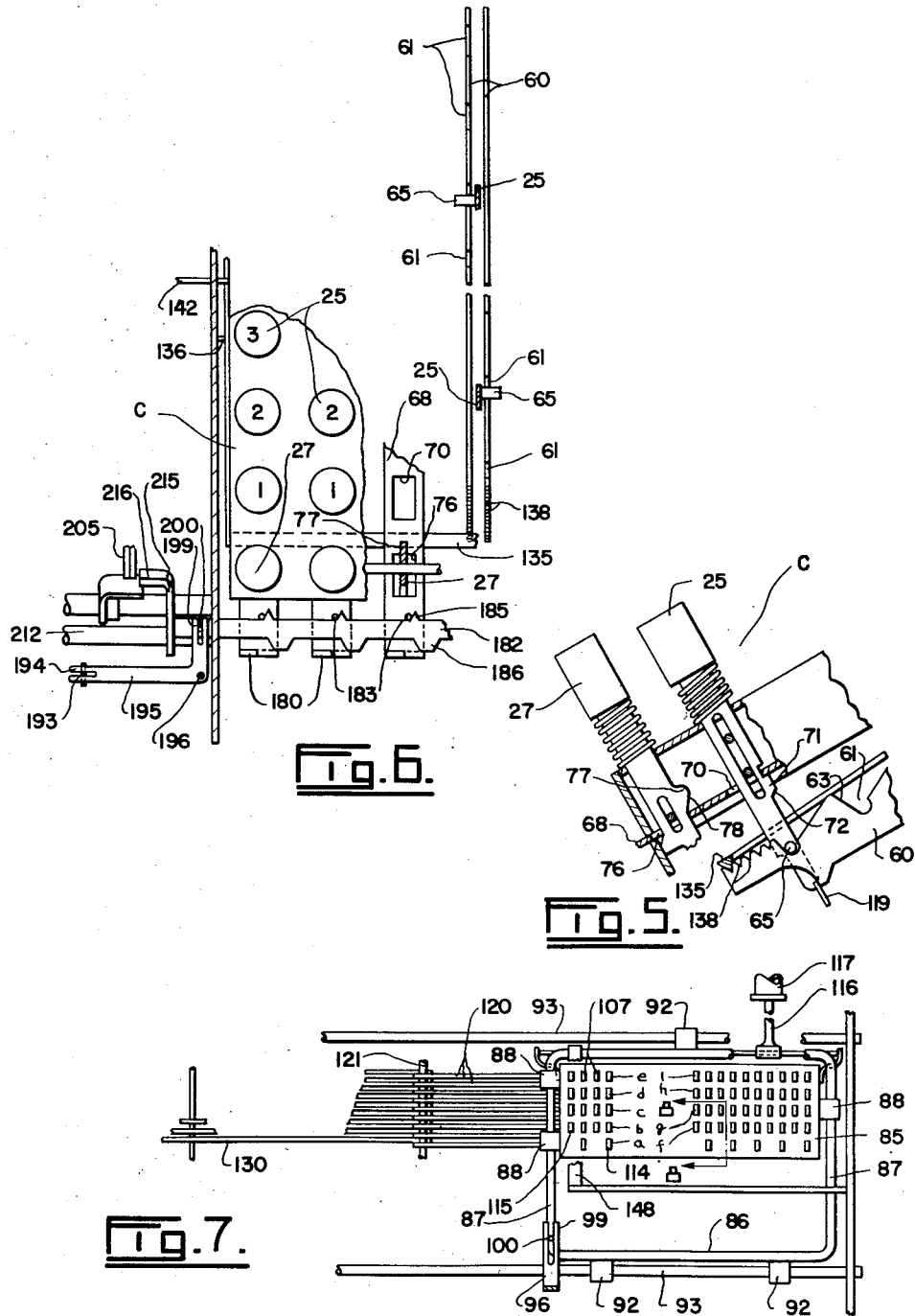
INVENTOR
HANS CARL HALUSS
BY
Fetherstonhaugh & Co.
ATTORNEYS July 30, 1957  H. C. HALUSS  2,801,052
SQUARING AND ADD-SUBTRACT MECHANISM FOR CALCULATING MACHINES
Filed May 12, 1953  5 Sheets-Sheet 5

INVENTOR
HANS CARL HALUSS
BY
Fetherstonhaugh & Co.
ATTORNEYS

United States Patent Office 2,801,052
Patented July 30, 1957

2,801,052

SQUARING AND ADD-SUBTRACT MECHANISM FOR CALCULATING MACHINES

Hans Carl Haluss, West Vancouver, British Columbia, Canada

Application May 12, 1953, Serial No. 354,600

23 Claims. (Cl. 235—63)

This invention relates to improvements in calculating machines.

An object of the present invention is the provision in a calculating machine of a mechanism which will enable squaring to be done by means of a single keyboard.

Another object is the provision of a mechanism which will enable a number which is entered in a keyboard to be squared.

A further object is the provision of a mechanism which will permit adding and subtracting to be done by the use of nine digit keys and a zero key.

A still further object is the provision of add-subtract mechanism for a calculating machine which will show each number being entered into the machine.

The mechanism of this invention is particularly designed for calculating machines of the type illustrated and described in United States Patent Nos. 2,376,997, 2,399,917 and 2,427,271.

Machines of this type have two keyboards, a multiplier keyboard and a main keyboard. The multiplier includes only nine keys representing numbers 1 to 9, and a "zero" key, while the main keyboard includes a plurality of ordinal rows of keys, each row including keys representing numbers 1 to 9. At the present time, if it is desired to square a number, the number is entered in the multiplier keyboard by depressing the desired keys, and it is also entered in the main keyboard by depressing corresponding keys therein. This takes time and it leaves room for mistakes, since a wrong number in either keyboard will result in an erroneous product.

With the present invention, it is only necessary to enter the number in the multiplier keyboard. Thus, if the correct number is entered, the product must be correct. Suitable means may be provided for clearing the main keyboard and blocking it against further entry before the number is entered in the multiplier keyboard. This eliminates any possibility of a key being depressed in the main board without the operator's knowledge.

This invention also provides add and subtract keys to be used with the multiplier keyboard. Normally in this type of calculator, the main keyboard is used for adding and subtracting, but this mechanism makes it possible to use the small multiplier keyboard alone for these purposes. There is less likelihood of error since there are fewer keys confronting the operator, the operator may work faster, and he can see each number entered in the machine, since this type indicates each number entered in the multiplier keyboard.

Figure 4:
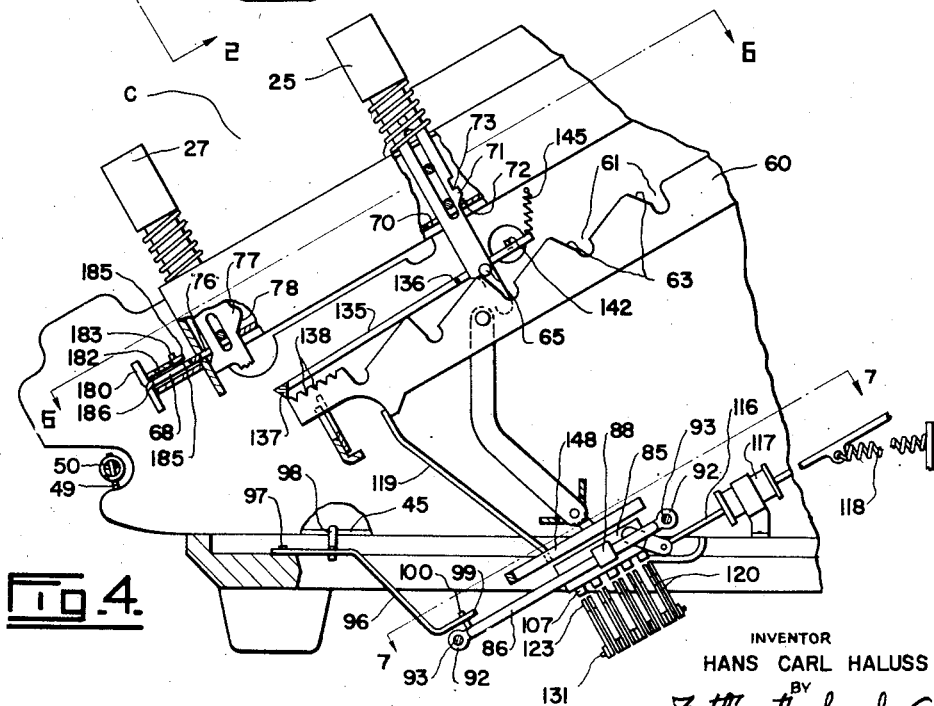
Figure 11:
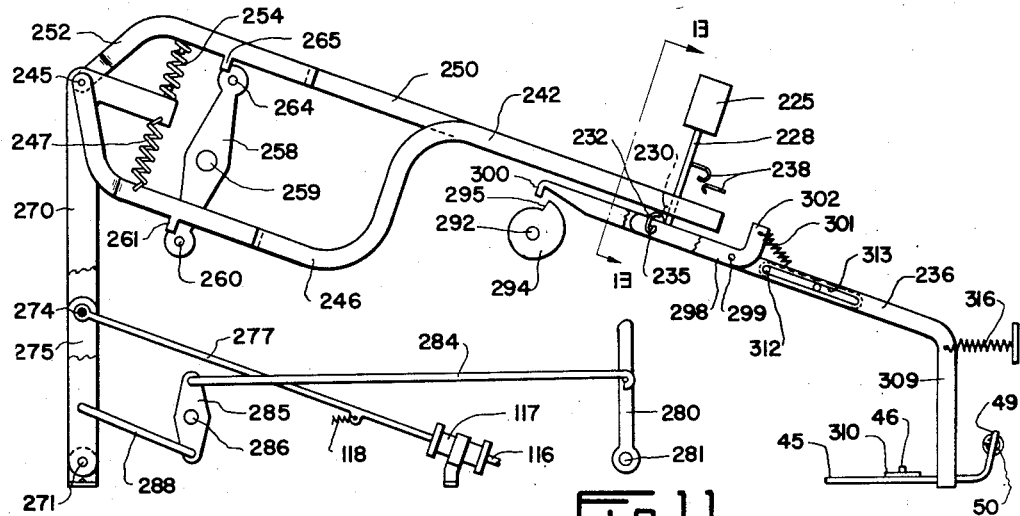
Figure 12:
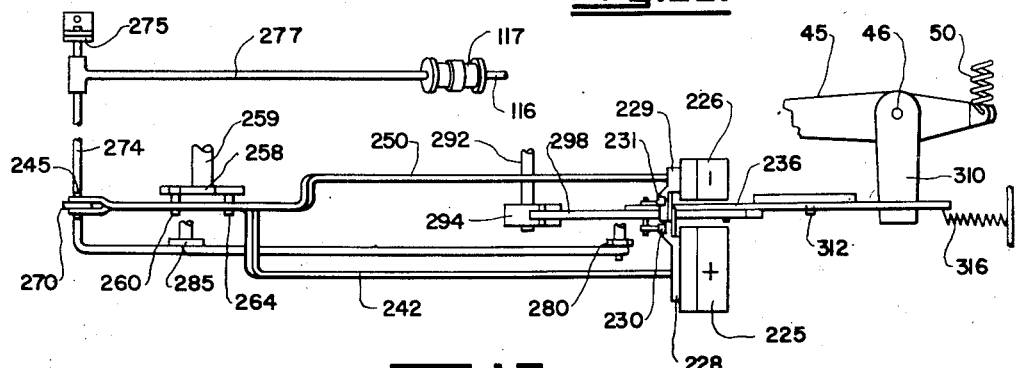
Figure 13:
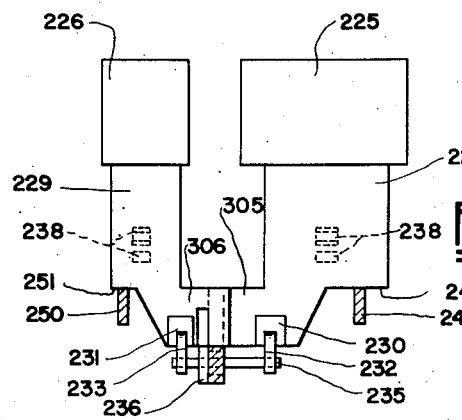

Examples of this invention are illustrated in the accompanying drawings, in which, Figure 1 is a perspective view of a calculating machine incorporating the various forms of this invention, Figure 2 is a fragmentary view looking into the machine from the front thereof in the direction of the arrows of line 2—2 of Figure 3, Figure 3 is a fragmentary section taken on the line 3—3 of Figure 2, Figure 4 is a fragmentary section taken on the line 4—4 of Figure 2, Figure 5 is a fragmentary sectional detail taken substantially on the line 5—5 of Figure 2, Figure 6 is a horizontal fragmentary section taken substantially on the line 6—6 of Figure 4, Figure 7 is a fragmentary horizontal section taken on the line 7—7 of Figure 4, Figure 8 is an enlarged sectional detail taken on the line 8—8 of Figure 7, Figure 9 is a perspective detail of some of the keys around the multiplier keyboard of the machine, Figure 10 is a fragmentary section taken on the line 10—10 of Figure 2, Figure 11 is a diagrammatic sectional view through the machine from front to back thereof at the multiplier keyboard illustrating part of the add-subtract mechanism, Figure 12 is a plan view of the mechanism shown in Figure 11, and Figure 13 is a sectional view taken on the line 13—13 of Figure 11.

Referring to Figure 1, A is a calculating machine having a multiplier keyboard B and a main keyboard C. The keyboard B includes nine keys 15 bearing the digits or numerals 1 to 9, and a "zero" key 16. It also includes four keys 17, three of which may be depressed to start a squaring operation as will hereinafter be explained. A viewing slot 18 is provided in the machine immediately above this keyboard. Each number entered in keyboard B is indicated at the viewing slot.

The main board C includes a plurality of keys 25 arranged in ordinal rows 26. Each of these rows has a clearing key 27 at the front end thereof, while the remaining keys contain the numbers 1 to 9.

The calculating machine described so far is illustrated and described in the patents referred to at the beginning of this specification. At the present time, when it is desired to square a number, the required keys are depressed in the multiplier keyboard B, and the corresponding keys are depressed in the main board C. For example, if the number to be squared is 125, keys 15 bearing the numerals 1, 2 and 5 are depressed in board B, and keys 25 bearing the numerals 1, 2 and 5 in three succeeding rows are depressed in the board C. After this is done, one of the multiplication keys 17 is depressed and the squaring operation takes place. It will readily be seen that if the operator does not enter exactly the same number in both keyboards, the result will be erroneous. Furthermore, it takes twice as long to make the entry as it would if it were only necessary to make the entry in one keyboard.

When a key 15 of the multiplier board is depressed, the number of that particular key appears in the viewing slot 18 at the right end thereof. When another key is depressed, the first number in the slot shifts one place to the left, and the numeral of the second key appears in the slot to the right of it. This is repeated for each digit, including "zero" by the depression of key 16.

Referring to Figures 2 and 3, there is a multiplier setting lever 30 beneath the board B for each key 15, each of these levers being pivotally mounted on a rod 31. For the sake of clarity, one only of the levers is illustrated in each of these figures. Each key 15 has a projection 33 with a depending portion 34 bearing against a part 35 of its lever 30 so that when the key is depressed, the lever is swung around rod 31 in the direction of arrow 36, see Figure 3.

A multiplier pin carriage 40 is slidably mounted beneath the multiplier keyboard and is movable laterally of the machine. This carriage has a plurality of pins 41 mounted therein, one of which is moved upwardly by the portion 42 of the stop lever 30 of the key depressed. Thus, when a key 15 is depressed, one pin of the carriage 40 is moved upwardly therein. Once this action has taken place the carriage is moved laterally one space in the machine. In other words, when a multiplier numeral key is depressed, a pin is moved upwardly in the carriage 40 and the latter shifted to the left one notch. After the squaring operation, the carriage is returned to its normal position and all upwardly-projecting pins thereof moved downwardly. As the mechanism and operation of this carriage do not form part of this invention, they need not be described herein. The pin carriage carries the mechanism for producing the digits at the viewing slot 18. A lever 45 pivotally mounted in the machine at 46 has an upwardly extending finger 47 bearing against and connected to the end of the carriage in the usual manner. The opposite or outer end of this lever has a lug 49 thereon to which one end of a coil spring 50 is connected, the opposite end of said spring being anchored to the machine frame at 51. This spring acting through the lever 45 forms the motive power for the pin carriage, but the control of the latter is not shown.

Beneath the main keyboard C are a plurality of value selection slides 60, usually two for each row 26 of keys 25 as shown in Figures 2, 4 and 6. Each of these slides has a plurality of notches 61 in its upper edge, there being in this example five notches in the lower half of one slide of each row, and four notches in the upper half of the other slide of the row, see Figures 4 and 5. It will be noted in Figure 4 that each notch is provided with a sloping edge 63, and that the angles of these edged slopes progressively become steeper from the upper notch to the lower notch of each slide. This applies to the notches in the upper portions of the alternate slides as well. Each key 25 has a laterally extending pin 65 which rests against the sloping edge 63 of a notch 61 of a selection slide. When a key is depressed, the pin 65 thereof bearing against the sloping edge 63 moves the slide forwardly or downwardly in the machine a predetermined distance. During the normal operation of the machine, the key remains depressed until the calculating operation has taken place, after which the slide and key are restored to their normal positions.

A locking bar 68 extends beneath each ordinal row 26, and the keys of said row extend through slots in this bar, see Figures 4 and 5. Each key 25 extends through a slot 70 in a locking bar, and has a lug 71 projecting outwardly therefrom normally positioned just above the slot. The lower side 72 of the lug slopes outwardly and upwardly from the key, while the upper side 73 extends outwardly therefrom substantially at right angles to form a shoulder. The release key 27 of each row extends through a slot 76 in a locking bar, and has a lug 77 projecting outwardly therefrom with a lower edge 78 which slopes upwardly and outwardly from the key. Each locking bar 68 is spring loaded so that it normally rests in a lowermost position with the upper edges of the slots 70 and 76 bearing against the keys 25 and 27, respectively, just below the lugs 71 and 77.

When a key 25 is depressed, the sloping edge 72 of its lug moves the locking bar 68 upwardly until the lug clears it, after which the spring loading of the bar returns it to its normal position with the shoulder 73 caught therebelow. It is obvious that a key locked in the depressed position will be released if another key in the same row is moved to a depressed position.

When a release key 27 is depressed, the sloping edge 78 of its lug 77 moves the locking bar upwardly sufficiently to release the lug 71 of any key 25 which may be retained in the depressed position. Thus it will be seen that the upward movement of the locking bar clears or releases any depressed keys in the ordinal row thereof.

From the description so far, it will be seen that when a number is entered in the multiplier keyboard B by depressing one or more keys 15, the setting lever 30 of each key is rotated about the pivot point or rod 31. It will also be seen that when a number is entered in the main keyboard C by depressing one or more keys 25, the selection slide 60 of each key is moved downwardly in the machine a predetermined distance and retained in the new position as long as the key is locked in the depressed position.

The apparatus described so far forms the background for the present invention.

As previously stated, the main purpose of this invention is to enable the operator to square a number merely by inserting the number in the multiplier keyboard. In order to do this, it is necessary, when the key of a given number is depressed in the multiplier keyboard, to move a predetermined distance the selection slide 60 of a key 25 with a corresponding number in the main keyboard, and to retain the slide in its new position until the machine performs its calculating operation in the usual manner.

In order to accomplish this, an auxiliary pin carriage 85 is positioned beneath the main keyboard C, see Figures 2, 4 and 7. This carriage is mounted for movement transversely of the machine and also at right angles to said movement. For this purpose, the carriage is mounted within a rectangular frame 86 having spaced sides 87 extending between the front and back of the machine in a plane substantially parallel with the general plane of the main keyboard. The pin carriage has bearings 88 slidably mounted on the sides 87 of the frame so that the carriage may be moved between the front and back of the machine or, owing to the sloping plane of the frame, up and down therein. The frame itself has a plurality of bearings 92 slidably mounted on parallel transverse shafts 93.

The pin carriage 85 is intended to be moved transversely of the machine with the multiplier pin carriage 40 beneath the multiplier keyboard. In other words, the carriage 85 is moved to the left one space each time a key is depressed in the multiplier keyboard. Carriage 85 may be connected to carriage 40 or to the mechanism for moving it in any desired manner. In this example, an arm 96 is pivotally mounted at 97 on the frame of the machine and extends generally towards the back thereof the same as the lever 45. The arm is connected to the lever by a suitable link 98 so that they move together, see Figures 2, 4 and 7. The arm 96 has a bifurcated end 99 into which a pin 100 fits, said pin projecting upwardly from a side 87 of the frame 86. With this arrangement, when the lever 45 moves pin carriage 40 to the left one space, pin carriage 85 moves with it, and when the multiplier carriage is returned to its normal position, the auxiliary carriage is also returned to its normal position, which is at the right end of its travel along the shafts 93.

The construction of a pin carriage of this nature is well known in the art. For the purpose of this description, it is only necessary to state that the carriage 85 includes upper and lower plates 105 and 106 between which a plurality of pins 107 slidably extend, see Figure 8. The lower end 108 of each pin projects downwardly below the plate 106, and a stop rod 109 prevents the pin from dropping downwardly out of the carriage. Each pin has a notch 112 in an edge thereof into which a portion of a spring 113 fits when the pin is moved upwardly removably to hold the latter in the upper position. By referring to Figure 7, it will be seen that the pins in the carriage are arranged in a plurality of pairs of ordinal rows 114 and 115 extending transversely of the carriage, each row 114 having five pins in it and each row 115 four pins.

The pin carriage 85 is moved up and down within the frame 86 in any convenient manner. In the illustrated example of the invention, see Figures 4 and 7, a bar 116 extends outwardly from the upper edge of the carriage, and the outer end of said bar forms the core of a single cycle solenoid 117. The carriage is held in its normal or upper position by a spring 118 which is anchored at one end and connected at its opposite end to the bar 116.

An arm 119 projects downwardly from the lower end of each selection slide 60 and terminates just above the plane of the lower edge of the pin carriage 85 when the latter is in its normal uppermost position, see Figures 2 and 4.

Figure 2 shows these arms bent so that the lower ends thereof are arranged close together but are spaced from each other and extend a distance substantially equal to the length of the auxiliary pin carriage. The spacing between the lower ends of these arms is exactly the same as the spacing between the rows 114 and 115 of the pin carriage. When the pin carriage is in its normal position towards the right of the machine, it is clear of the lower ends of the arms 119. When it is moved to the left one space, it moves sufficiently to cause the first rows 114 and 115 at the left end thereof to overlap the first two arms 119 at the right side of the group. Each time the pin carriage moves, it travels a distance sufficient to move a pair of rows into line with the next pair of arms. These arms are arranged in pairs since the selection slides 60 are arranged in pairs, there being one pair for each row 26 in the main keyboard.

As set out above, there are nine pins 107 in each pair of rows 114 and 115. It is necessary to provide means for elevating each of these pins in the pin carriage. This is accomplished by means of nine setting levers 120 pivotally mounted on a common rod 121, see Figures 2, 4 and 7. Each setting lever has at one end an upwardly extending projection 123, and a depending portion 124 at the rod end thereof. It will be noted that the levers 120 are of two different lengths so that the lugs 123 of one set are arranged in a row parallel with the lugs 123 of the other set. One row has five lugs in it, while the other has four. Furthermore, Figure 2 shows that these rows of lugs are arranged just to the right of the first pair of arms 119 at the right side of the group thereof, while they are positioned immediately beneath the first pair of rows 114 and 115 at the left end of pin carriage 85 when the latter is in its normal or neutral position.

Each time a setting lever is pivoted upwardly, the lug 123 thereof engages a pin 107 of the pin carriage and moves it into its upper position where it is retained by a spring 113. The timing of this mechanism is such that after a setting lever 120 is operated to elevate a pin in the pin carriage, the latter is advanced one space.

There is a setting lever 120 for each key 15 in the multiplier keyboard B, and it is desirable to operate or pivot one of these levers each time a key is depressed, and this may be done in any desired manner. In the illustrated form of the invention, a finger 128 extends downwardly from the lower end of each setting lever 30 beneath the multiplier keyboard and overlaps the end 129 of a long link 130, see Figures 2 and 3, the opposite end of which is connected to the depending portion 124 of a setting lever 120 at 131. The end 129 of each lever is bevelled so that when the finger 128 is moved against said bevel, it forces the link laterally towards the pin carriage 85. This action causes the setting lever 120 to which the link is connected to swing upwardly to move the carriage pin above it into its upper position.

Suitable means is provided for retaining the selection slides 60 in any position to which they are moved. A U-shaped bail 135 is pivotally mounted adjacent and spaced from each end thereof at 136. The bottom section 137 of the U normally rests on the lower ends of the selection slides, see Figure 4. Each of these slides has a plurality of notches 138 in the upper edge thereof near its lower end. There is one of these notches for each notch 61 in each slide so that there are five notches 138 in some slides and four in the others. The lower edge of the portion 137 of the bail is V-shaped in cross section, see Figure 4, and each of the notches 138 is correspondingly shaped but is not very deep, so that the bail will move in and out of these notches as the slide is moved downwardly. When the slide reaches the end of this downward travel, the bail will fit in one of the notches and retain the slide in this position until the bail is raised.

After the calculating operation of the machine has taken place, bail 135 is raised to free the selection slides in any desired manner. Since the multiplier pin carriage 40 is returned to its normal position after the calculating operation, this may be used to raise the bail to free the selection slides. For this purpose, a lug 142 projects outwardly from an end of this pin carriage, the outer end 143 of this lug sloping outwardly and upwardly, see Figure 2. When the pin carriage is in its normal or neutral position, the end 143 of the lug bears against one side of the bail 135 above the pivot thereof. As the lug moves into this position, it depresses the end of the bail sufficiently to raise the portion 137 thereof clear of the selection slide notches 138. If desired, a spring 145 anchored to the frame at one end and to the end of the bail at the opposite end, tends to draw said bail end upwardly to urge the portion 137 into engagement with the ends of the selection slides.

The action of the mechanism described so far when a number is entered in the multiplier keyboard is as follows:

There is a pin 107 in each pair of rows 114 and 115 of the auxiliary carriage 85 for each key 15 in the multiplier keyboard. In each row 114, the pins 107 lettered $a$, $b$, $c$, $d$ and $e$ correspond respectively to the keys 15 bearing the numerals 1 to 5, while the pins lettered $f$, $g$, $h$ and $i$ of each row 115 correspond to the keys numbered 6 to 9. Assuming that the number to be squared is 136, key 15 with the numeral 1 is depressed. This swings a setting lever 30 thereof downwardly to cause the finger 128 thereof to shift a link 130 laterally. This raises a setting lever 120 and the pin 107a in the left hand row 114 of pin carriage 85 then moves upwardly. As soon as this takes place, lever 45 moves pin carriage 40 one space to the left causing the pin carriage 85 to move one space in the same direction. Such movement, shifts the elevated pin into line with the lower end of one of the arms 119 of the first pair of selection slides 60 at the right side of the machine. When key 15 bearing the numeral 3 is depressed, another setting lever 120 is pivoted to raise the pin 107c of the next row 114 to the right of the pin carriage. Following this, the carriage shifts to the left to move the elevated pin 107a into line with an arm 119 of the next adjacent pair of selection slides, and the newly raised pin 107c into line with one of the arms of the first pair of selection slides. When the key bearing the number 6 is depressed, another setting lever 120 is pivoted to raise the pin 107f of the third row 115 from the left of the pin carriage, after which the shifting of the section to the left moves pins 107a and 107c into line with arms 119 of the next pairs of selection slides and the newly raised pin 107f into line with one of the arms of the first pair of selection slides. The number to be squared is now entered in the keyboard and the machine is ready for the calculation.

If the number to be squared includes a "zero," key 16 is depressed at the proper time. This causes the auxiliary carriage to be shifted one space without an additional pin being raised therein. Furthermore, the number appears in the viewing slot 18 so that the operator knows whether or not he has inserted the correct number.

When a multiplication key 17 is depressed to set the machine into operation, the solenoid 117 is energized in a manner hereinafter described. When a calculating machine of this nature is set into operation, there are actually two cycles of operation. The first, clearing the machine, and the second, doing the calculating. In the present case, when the machine is set into operation, solenoid 117 is energized for an instant during the first cycle of operation. This moves the bar 116 and, consequently, the pin carriage 85 downwardly or forwardly in the machine. As this takes place, the raised pins of the section engage the arms 119 in line therewith to remove their respective selection slides 60 in the same direction. The amount of movement of each slide depends upon the position of the raised pin in the stop section. In the present example, pin 107a would move the slide the full distance, pin 107c would move its slide a shorter distance, while the pin 107f would move its slide a distance between that of the other two slides. When the selection slides are shifted in this manner, the bail 135 retains them in the positions to which they are moved. These positions are those to which the selection slides would have been moved if keys 25 of the main keyboard bearing the desired numerals had been depressed. Thus, the calculation that takes place in the machine during the second cycle is exactly the same as it would have been if the same number had been entered in both the multiplier and the main keyboards.

At the same time as the calculating operation takes place, the pin carriage 40 is returned to its normal position. The end 143 of the lug 142 projecting from this carriage raises the bail 135 to free the selection slides to permit them to return to their normal positions under the spring loading thereof. Of course, pin carriage 85 returns to its normal position along with pin carriage 40.

A restoring bar 148 extends across the path of pin carriage 85 just clear of the group of lower ends of arms 119, see Figure 2. The lower edge of this bar just clears the upper surface of the pin carriage when the latter moves beneath it. The bar has a bevel surface 149 engaged by the upper end of any pin 107 which may be in its upper position as the pin carriage returns to its normal position. The bevel of the bar is such that these pins are depressed and freed from springs 113 so that they return to their normal positions in the carriage. As the pin carriage 40 over-rides its normal position each time it is returned thereto, the auxiliary pin carriage also overrides its normal position. This overriding consists in the carriage moving one space to the right of the normal position and returning to the latter as part of the return action. Thus, the over-riding action ensures the pin of the first two rows at the left end of the auxiliary pin carriage being depressed by the restoring bar 148.

The pins of the pin carriage 85 may be raised manually when the numeral keys 15 of the multiplier keyboard are depressed, but it is preferable to use a solenoid to carry out this operation. A pair of links 155 and 155a pivotally connected together at 156 extend downwardly from the projection 33 of each key 15, see Figure 2. Each of the lower links 155 has a shoulder 158 projecting outwardly from one side thereof, and a bevelled surface 159 at its lower end extending towards its opposite edge. The lower part of this bevel normally rests against a bar 160 in the machine. The shoulder 158 extends towards and is normally just clear of a horizontal universal bar 164 pivotally mounted at its opposite edge 165 on a rod 166, see Figures 2 and 10. A plate 168 projects downwardly from the bar at the pivot thereof and overlaps, but is normally spaced from the armature 169 of a solenoid 170. When the universal bar is in its normal inoperative position, the upper surface of shoulder 158 is in a plane just below that of the bar.

When a key 15 is depressed, the first part of the movement moves the bevel 159 of the link 155 connected thereto over the surface of the rod 160. This action shifts the shoulder 158 below the free edge of the universal bar 164. At the same time, the key closes a pair of contacts 174, see Figure 2, which are located in the circuit of the solenoid to cause the latter to be energized momentarily. This attracts the plate 168 to the solenoid core, causing the free edge of the universal bar to swing downwardly against shoulder 158 further to depress the key 15. Thus, solenoid 170 provides the power for shifting link 130 laterally, raising a setting lever 120, and lifting a pin 107 in the pin carriage 85. When the key 15 is restored to its normal position in the usual manner, the universal bar is returned to its position and the shoulder 158 moves clear of it.

It is desirable to clear the main keyboard C and to lock the keys thereof against further entry before starting to use the machine for squaring purposes. This is done by moving all the locking bars 68 upwardly in the machine to release any of the keys 25 which may be held in the depressed position thereby, and then to lock said bars in their lowermost or normal positions so that it is impossible to depress any of the keys.

Each of the locking bars 68 is provided at its lower end with an upwardly extending lug 180, and a bar holding 182 lies across the ends of the locking bars inside these lugs, see Figure 4 and 6. A pin 183 extends upwardly from each locking bar on the opposite side of the bar 182 from the lug 180. A V-shaped projection 185 extends outwardly from the bar 182 beside each pin 183, while a stop 186 extends outwardly from the opposite side of the bar near each projection. As clearly seen in Figure 6, each projection 185 is normally positioned against a pin 183 of a locking bar, while a corresponding stop 186 is spaced from the lug 180 of the same locking bar. When the bar 182 is shifted laterally, the projections thereof bear against the pins 183 to move the locking bars 68 upwardly or inwardly of the machine. The projections 183 shift to the other side of the pins. After these pins clear the projections, the stops 186 move inside the lugs 180 to prevent the locking bars from being shifted in the machine. Thus, at this time, it is impossible to depress any key 25 of the main board.

A clearing key 190 is provided adjacent the multiplier keyboard B, see Figures 1, 3 and 9, for shifting the bar 182. This key includes a stem 191 which is pivotally mounted at its lower end at 192. This stem has a reduced portion fitting into the bifurcated end 194 of a bell crank 195 which is pivotally mounted at 196, see also Figure 6. The opposite end 199 of this crank is also bifurcated and fits around a pin 200 projecting upwardly from the adjacent end on the bar 182.

With this arrangement, when the key 190 is moved forwardly in the machine, the bell crank 195 is rotated to shift the holding bar 182 through its clearing and locking movement. This action moves all the locking bars 68 upwardly in the machine to clear the main keyboard and then locks said bars in their lowermost or normal positions. The main keyboard cannot be accidentally or otherwise used until the key 190 is returned to its normal or inoperative position.

The solenoid 117 may be energized in any convenient manner, and a separate key may be provided for this purpose. However, it is desirable to energize this solenoid when either of the multiplication keys 17 is depressed. This fits the slide-setting movement of the pin carriage 85 with the normal operation of the machine.

In this calculating machine, each of the keys 17 is provided with an arm 205 extending towards the front of the machine and having a sloping surface 206 at its outer end, said surface sloping inwardly and downwardly of the machine. As there are two of these keys at each side of the multiplier keyboard, there is a pair of these arms 205 on each side thereof, and the free ends of said arms are positioned side by side and terminate in the same plane, see Figure 9.

One way of energizing the solenoid 117 is to provide a pair of normally open contacts 210 in the circuit thereof. One of these contacts is carried by a rotatably mounted shaft 212 which has a pair of L-shaped lugs 215 fixably mounted thereon and projecting upwardly therefrom. There is a lug 215 adjacent each pair of arms 205 with the horizontal portion 216 of each lug normally just clear of the sloping ends 206 and to one side thereof. The shaft 212 may be shifted laterally of the machine to move the portions 216 of the lugs into line with the arms 205 against the lower portions of the sloping ends 206 thereof. For this purpose, the end of the bar 182 may be extended slidably to engage a side of one of the lugs, see Figures 6 and 9. Thus, when the bar is shifted to the left, the lugs are moved in the same direction. When any one of the multiplication keys 17 is depressed, the lug bearing against the outer end of the arm 205 thereof is swung outwardly by the sloping end 206. This pivots the shaft 212 to close the contacts 210 and thereby energizes the single cycle solenoid 117. As previously stated, the depression of any key 17 sets the machine into operation. The first cycle of the operation normally clears the machine, during which time the solenoid moves the pin carriage 85 downwardly, and upon completion of its full stroke, the solenoid cuts itself out, thereby permitting spring 118 to return the carriage to its normal position. The final cycle or calculating operation of the machine now takes place.

Every time a multiplying or squaring operation takes place, the product is indicated in the large dial 220 as is customary in machines of this type.

It is a relatively simple matter to employ the auxiliary pin carriage arrangement described above for adding and subtracting in this machine. Prior to this invention the main keyboard C was used for adding and subtracting. Each number was inserted in this keyboard by depressing the required keys 25. After each number was inserted in the machine, an add or subtract key was depressed to set the machine into operation. As previously stated, the selection slides 60 are moved by the keys 25. It is obvious then that the keys 15 of the multiplier keyboard B may be used to move the selection slides ready for the addition or subtraction operation. As the keys 17 cannot be used to cause the solenoid 117 to be energized to move the auxiliary pin carriage and set the selective slides, without the machine performing a squaring operation, it is necessary to provide suitable mechanism for causing this action to take place.

Figures 11 to 13 diagrammatically illustrate one form of add-subtract mechanism which may be used. Plus and minus keys 225 and 226 are provided at a suitable point in the machine. In this example, these keys are positioned at the top of the multiplier keyboard B, see Figure 1. The plus and minus keys have stems 228 and 229 extending downwardly therefrom having shoulders 230 and 231 extending outwardly therefrom normally positioned a little above spring catches 232 and 233, respectively. These catches are mounted on and project upwardly from a shaft 235 which is carried by a horizontally-movable bar 236. Each of these keys is spring loaded in its uppermost position in any desired manner, not shown, but when it is depressed, the shoulder 230 or 231 thereof moves into a position to be engaged by one of the catches 232 or 233, which retains it in the lower position until the catch is disengaged therefrom. Each of these keys is provided with a pair of normally open contacts 238 located in the electrical circuit of the solenoid 117 so that when either key is depressed, the solenoid is energized.

An arm 242 extends beneath a shoulder 243 formed on stem 228 of the key 225, said arm being pivotally mounted at its opposite end at 245. This arm is formed with a U-shaped portion 246 so that the pivoted end thereof extends upwardly to the pivot 245, as clearly shown in Figure 11. A tension spring 247 normally draws this arm upwardly so that it bears against the key shoulder 243.

Another arm 250 extends at one end beneath a shoulder 251 formed on the stem 229 of the key 226. The opposite end of this arm is formed with a downwardly-extending portion 252 which is also mounted on the pivot 245. A compression spring 254 normally urges this arm upwardly against the key shoulder.

The machine is provided with the usual add-subtract gate 258 which is mounted on the end of a rotatable shaft 259. This gate has a pin 260 at its lower end normally positioned below and in front of a lug 261 projecting downwardly from the U-shaped section 246 of the arm 242. The gate also has a pin 264 at its upper end normally positioned below and in front of a lug 265 projecting downwardly from the arm 250.

When the key 225 is depressed, the lug 261 is moved into line with the lower pin 260 of the add-subtract gate 258. Similarly, when the key 226 is depressed, the lug 265 is moved into line with the upper pin 264 of the gate.

The pivot 245 is carried by the upper end of a lever 270 which is pivotally mounted at its lower end at 271. A rod 274 extends laterally from this lever to another lever 275 spaced therefrom and pivotally mounted at its lower end. A link 277 extends from the rod 274 at one end to the end of the bar or core 116 to solenoid 117, to which it is connected.

Referring particularly to Figure 11, 280 is the motor and clutch release lever of the calculating machine, said lever being fixedly mounted at its lower end on a rotatable shaft 281. When this lever is moved to rotate the shaft, the machine performs addition or subtraction in the usual manner. In order to move this lever at the right time, it is necessary to provide a connection between it and the lever 270. Furthermore, in order to fit in with the normal operation of the machines, the lever 280 must be moved in the opposite direction to the movement of lever 270. For this purpose, a link 284 extends from a lever 280 to one end of a reversing lever 285 which is pivotally mounted midway between its ends at 286. Another link 288 extends from the lower end of this reversing lever to the lever 270.

The operation of the add-subtract mechanism described so far is as follows:

When the plus key 225 is depressed, the arm 242 is pivoted downwardly about the point 245 to move the lug 261 into position behind the lower pin 260 of the add-subtract gate 258. The catch 232 engages the shoulder 230 to lock the key in the depressed position. At the same time, contacts 238 are closed to energize the solenoid 117. As previously stated the operation of the solenoid sets the required slides of the main keyboard. Simultaneously, the link 277 causes the upper end of lever 270 to swing forwardly. This moves lug 261 in the same direction to pivot or actuate the gate 258 to set it in the add position. The links 288 and 284 move or trip the motor and clutch release lever 280 to cause the adding operation to take place in the machine in the usual manner. After this action has taken place, the key 225 is released in a manner hereafter described, so that the solenoid 117 is deenergized to allow the spring 118 to restore the levers 270 and 280 and associated elements to their normal positions.

When the minus key 226 is depressed, the catch 233 engages the shoulder 231 to lock it in the depressed position. This movement of the key depresses the arm 250 to move the lug 265 into line with and behind the upper pin 264 of the add-subtract gate. At the same time, the contacts 238 of this key are closed to energize the solenoid 117. The action described above in connection with key 225 is now repeated, with the exception that the gate 258 is moved by lug 265 into the subtract position so that the following action of the calculating machine is a subtracting operation.

As previously stated, each time a key 15 in the multiplier keyboard is depressed, the multiplier pin carriage 40 and the auxiliary pin carriage 85 are stepped one place to the left, and a pin is raised in the auxiliary carriage. It is necessary to provide means for restoring these carriages to their normal positions after each adding and subtracting operation. There is a main shaft 292 extending transversely of this calculating machine which makes one revolution during the calculating operation. In order to provide for the restoration of the multiplier and auxiliary pin carriages, a cam 294 is fixedly mounted on this shaft, said cam having a shoulder 295 radiating therefrom. An arm 298 is pivotally mounted at 299 on the bar 236 and extends towards this cam. The arm has a hook 300 on its outer end which is normally held just above the cam by a spring 301 connected to an upturned portion 302 at the opposite end of the arm, said spring extending from this upturned portion to the bar 236. The arm 298 extends beneath and bears against projections 305 and 306 which extend from the stems of the keys 225 and 226, respectively, towards and overlap each other, as shown in Figure 13. These projections limit the upward movement of the outer end of the arm 298 under the influence of spring 301.

The outer end of bar 236 is bent downwardly as at 309 and overlaps an arm 310 which is fixedly secured to the lever 45 at the pivot point 46 thereof. When the outer end of arm 310 is moved inwardly of the machine, the lever 45 is pivoted so that its inner end moves the pin carriage 40 to its normal at-rest position. This, of course, also returns the auxiliary carriage 85 to its normal position. A pin 312 projecting through a slot 313 in bar 236 limits the outward movement of the latter, and a spring 316 normally retains said bar in its outer position.

When either key 225 or 226 is depressed, the projection 305 or 306 thereof pivots the free end of the arm 298 downwardly to move the hook 300 thereof towards cam 294 into the path of movement of its shoulder 295. As previously stated, movement of the motor and clutch release lever 280 results in the main shaft 292 rotating. This turns cam 294. It will be noted that the cam moves through the larger part of one rotation before the shoulder 295 engages the hook 300 to allow the adding or subtracting operation to take place. When the shoulder does engage this hook, it moves the arm 298 and, consequently, the bar 236 with its bent portion 309 inwardly of the machine. The bar portion 309 engages the arm 310 to pivot the lever 45 to move the two pin carriages to their normal positions. As the catches 232 and 233 are supported by the bar 236, this movement moves these catches away from the key stems so that the shoulder 230 or 231, depending upon which key was depressed in order to start the operation, is released to permit the key to return to its normal position. As the cam continues to rotate, the shoulder 295 moves clear of the hook and the spring 50, connected to lever 45, draws said lever and arm 310 back to their normal positions. At the same time, spring 316 moves bar 236 and arm 298 back to their outer positions. Shaft 292 and its cam automatically stop upon completion of a revolution so that the shoulder 295 stops in a position where it must move some distance before it again engages hook 300. Spring 301 normally keeps the hook far enough from the cam to permit the latter to rotate without its shoulder engaging the hook unless either key 225 or 226 has been depressed and locked in its lower position. This permits the machine to carry out its other calculating operations without moving bar 236.

An advantage in being able to use the small multiplier keyboard for add-subtract operations is that each number entered in the keyboard appears at the slot 18. The result at the end of each operation is indicated by the dial 220, in the usual manner.

What I claim as my invention is:

1. In a calculating machine having a main keyboard with a plurality of keys arranged in ordinal rows, at least one value selection slide movably mounted beneath each row, each slide being moved predetermined distances by each of a plurality of keys in the row thereof, each of said keys moving the slide a distance different from the other keys which move the same slide; a multiplier keyboard with nine digit keys and a zero key; at least one multiplication key near the multiplier board; and a multiplier pin carriage movably mounted near the multiplier keyboard normally at an at-rest position, said pin carriage being moved one space away from its normal position each time a key is depressed in the multiplier board and restoring to its normal position after the machine performs a calculating operation involving the multiplier keyboard; squaring mechanism comprising an auxiliary pin carriage slidably mounted near the selection slides for movement in the direction of movement of the latter and for movement substantially at right angles thereto, a plurality of pins arranged in spaced ordinal rows in the auxiliary carriage, said pins being movable into positions projecting upwardly from the carriage, means connecting the auxiliary carriage to the multiplier pin carriage for movement therewith substantially at right angles to the movement of the slides, means extending from each digit key in the multiplier board for raising a pin in the auxiliary carriage when the key is depressed, and means connected to the auxiliary pin carriage to move the latter in the direction of movement of the selection slides, any raised pin during the latter movement of the auxiliary carriage engaging a slide aligned therewith to move said slide.

2. A squaring mechanism for calculating machines as claimed in claim 1 in which there is a a locking bar for each row of keys in the main keyboard, each locking bar being moved from a normal position by any key in the row thereof being depressed, each of said bars removably retaining any depressed key in the row thereof in its lower position and being movable to release said key, and including a clearing key movably mounted near the multiplier keyboard, and means connected to said key for moving all the locking bars and then locking the latter in their normal positions upon movement of the clearing key, thereby locking the main board keys in their upper positions.

3. A squaring mechanism for calculating machines as claimed in claim 2 in which each locking bar has a lug extending outwardly therefrom adjacent one end thereof and a pin extending in the same direction spaced from the lug, and the means for moving and locking the locking bars comprises a holding bar slidably extending across the locking bars between the lugs and pins thereof, means connecting the holding bar to the clearing key, a V-shaped projection on one edge of the holding bar beside each pin, and a stop extending outwardly from the opposite edge of the holding bar normally spaced a little from each lug, whereby longitudinal movement of the holding bar by the clearing key causes the V-shaped projections to move the locking bars through the pins and the stops to move opposite the lugs to prevent subsequent movement of the locking bars.

4. A squaring mechanism for calculating machines as claimed in claim 1 including means for moving the auxiliary pin carriage at right angles to its movement with the multiplier pin carriage when the multiplication key is depressed, and an arm extending from each selector slide towards the auxiliary carriage, the ends of said arms near the carriage being spaced apart distances equal to the spaces between the rows of pins of the carriage, whereby any raised pins engage arms in line therewith to move the slides connected thereto when the carriage is moved after the multiplication key is depressed.

5. A squaring mechanism for calculating machines as claimed in claim 4 in which the rows of pins of the auxiliary carriage extend in the same direction as the selection slides, each pin of a row moving an arm and slide a predetermined distance.

6. A squaring mechanism for calculating machines as claimed in claim 4 in which the auxiliary carriage is positioned to be normally clear of the selection slide arms, and the rows of pins of the auxiliary carriage are so positioned that each time said carriage is moved by the multiplied carriage, the rows of pins are progressively moved laterally across the path of movement of the arms, each movement shifting each row to the path of the next arm along the line of movement.

7. A squaring mechanism for calculating machines as claimed in claim 4 including stop means for removably holding the selection slides in the positions to which they are moved by the auxiliary pin carriage, and means for releasing the stop means as the pin carriages return to their normal positions.

8. A squaring mechanism for calculating machines as claimed in claim 4 including a restoring bar extending across the path of movement of the auxiliary pin carriage and just clearing the latter, said bar having a bevel surface engaged by any pins projecting upwardly from the carriage to depress said pins during the return movement of the carriages.

9. In a calculating machine having a main keyboard with a plurality of keys arranged in ordinal rows, at least one value selection slide movably mounted beneath each row, each slide being moved to predetermined distances by each of a plurality of keys in the row thereof, each of said keys moving the slide a distance different from the other keys which move the same slide; a multiplier keyboard with nine digit keys and a zero key; at least one multiplication key near the multiplier board; and a multiplier pin carriage movably mounted near the multiplier keyboard normally at an at-rest position, said pin carriage being moved one space away from its normal position each time a key is depressed in the multiplier board and restoring to its normal position after the machine performs a calculating operation involving the multiplier keyboard; squaring mechanism comprising an auxiliary pin carriage slidably mounted near the selection slides for movement in the direction of movement of the latter and for movement substantially at right angles thereto, a plurality of pins arranged in spaced ordinal rows in the auxiliary carriage, said pins being movable into positions projecting upwardly from the carriage, means connecting the auxiliary carriage to the multiplier pin carriage for movement therewith substantially at right angles to the movement of the slides, means extending from each digit key in the multiplier board for raising a pin in the auxiliary carriage when the key is depressed, a solenoid having a core movable therein, means connecting the core to the auxiliary pin carriage, means for energizing the solenoid to move the carriage at right angles to its movement with the multiplier pin carriage, and an arm extending from each selector slide towards the auxiliary carriage, the ends of said arms near the carriage being spaced apart distances equal to the spaces between the rows of pins of the carriage, whereby any raised pins engage arms in line therewith to move the slides connected thereto when the carriage is moved after the multiplication key is depressed.

10. A squaring mechanism for calculating machines as claimed in claim 9 in which the means for enegizing the solenoid is operated by a multiplication key.

11. In a calculating machine for performing multiplying, adding and subtracting calculations, said machine having a main keyboard with a plurality of keys arranged in ordinal rows, at least one value selection slide movably mounted beneath each row, each slide being moved predetermined distances by each of a plurality of keys in the row thereof, each of said keys moving the slide a distance different from the other keys which move the same slide; a multiplier keyboard with nine digit keys and a zero key; and a multiplier pin carriage movably mounted near the multiplier keyboard normally at an at-rest position, said pin carriage being moved one space away from its normal position each time a key is depressed in the multiplier board and restoring it to its normal position after the machine performs a calculating operation involving the multiplier keyboard; an add-subtract gate to be selectively operated to cause adding or subtracting operations to be performed, add-subtract mechanism comprising an auxiliary pin carriage slidably mounted near the selection slides for movement in the direction of movement of the latter and for movement substantially at right angles thereto, a plurality of pins arranged in spaced rows in the auxiliary carriage, said pins being movable into positions projecting upwardly from the carriage, means connecting the auxiliary carriage to the multiplier pin carriage for movement therewith substantially at right angles to the movement of the slides, means extending from each digit key in the multiplier board for raising a ipn in the auxiliary carriage when the key is depressed, means for moving the auxiliary carriage transversely of its movement with the multiplier carriage, an arm extending from each selector slide towards the auxiliary carriage, the ends of said arms near the carriage beaing spaced apart distances equal to the spaces between the rows of pins of the carriage, said raised pins engaging arms in line therewith to move the slides connected thereto when the carriage is moved transversely, actuating means for selectively moving the add-subtract gate to the add and subtract positions as the auxiliary carriage moves transversely, and restoring means for returning both pin carriages to their normal positions after each add-subtract calculation.

12. Add-subtract mechanism for calculating machines as claimed in claim 11 which the means for selectively moving the add-subtract gate comprises plus and minus keys, means operated by the plus key for moving the gate in one direction when said key is depressed, and means operated by the minus key for moving the gate in the opposite direction when the latter key is depressed.

13. Add-subtract mechanism for calculating machines as claimed in claim 12 including means for locking each plus and minus key in the depressed position, and means for releasing each locked key after an add and a subtract operation.

14. Add-subtract mechanism for calculating machines as claimed in claim 12 in which the means for moving the auxiliary pin carriage transversely is a solenoid, and including contacts in the electrical circuit of the solenoid closed by each plus and minus key when the latter is depressed.

15. Add-subtract mechanism for calculating machines as claimed in claim 12 in which the machine includes a main shaft which makes one revolution during each add or subtract calculation; and in which the carriage restoring means comprises a cam fixedly mounted on the main shaft, a shoulder radiating from the cam, an arm having a hook on one end, means normally retaining the hook just out of the path of the cam shoulder, means on each of the plus and minus keys for moving the arm to shift the hook thereof into the cam shoulder path when the key is depressed, and means connected to the arm for returning both stop carriages to their normal positions when the cam shoulder engages and moves the hook during rotation of the cam.

16. Add-subtract mechanism for calculating machines as claimed in claim 15 including means for returning the arm to its normal position with the hook clear of the cam shoulder path when a depressed key is released.

17. In a calculating machine for performing multiplying, adding and subtracting calculations, said machine having a main keyboard with a plurality of keys arranged in ordinal rows, at least one value selection slide movably mounted beneath each row, each slide being moved predetermined distances by each of a plurality of keys in the row thereof, each of said keys moving the slide a distance different from the other keys which move the same slide; a multiplier keyboard with nine digit keys and a zero key; and a multiplier pin carriage movably mounted near the multiplier keyboard normally at an at-rest position, said pin carriage being moved one space away from its normal position each time a key is depressed in the multiplier board and restoring it to its normal position after the machine performs a calculating operation involving the multiplier keyboard; an add-subtract gate to be selectively operated to cause adding or subtracting operations to be performed, add-subtract mechanism comprising an auxiliary pin carriage slidably mounted near the selection slides for movement in the direction of movement of the latter and for movement substantially at right angles thereto, a plurality of pins arranged in spaced rows in the auxiliary carriage, said pins being movable into positions projecting upwardly from the carriage, means connecting the auxiliary carriage to the multiplier pin carriage for movement therewith substantially at right angles to the movement of the slides, means extending from each digit key in the multiplier board for raising a pin in the auxiliary carriage when the key is depressed, means for moving the auxiliary carriage transversely of its movement with the multiplier carriage, an arm extending from each selector slide towards the auxiliary carriage, the ends of said arms near the carriage being spaced apart distances equal to the spaces between the rows of pins of the carriage and movement of the latter moves pin rows into line with arm ends, any raised pins engaging arms in line therewith to move the slides connected thereto when the carriage is moved transversely, plus and minus keys, means operated by the plus key for moving the add-subtract gate in one direction when said key is depressed, means operated by the minus key to move the gate in the opposite direction when the latter key is depressed, and means operated by the plus and minus keys for causing add and subtract calculation respectively to take place.

18. Add-subtract mechanism for calculating machines as claimed in claim 17 including restoring means for returning both pin carriages to their normal positions after each add-subtract calculation.

19. Add-subtract mechanism for calculating machines as claimed in claim17 in which the means for moving the auxiliary pin carriage transversely and the motive power for the add-subtract gate moving means is a solenoid, and including contacts in the electrical circuit of the solenoid closed by the plus and minus keys when they are depressed.

20. In a calculating machine having a main keyboard with a plurality of keys arranged in ordinal rows, at least one value selection slide movably mounted beneath each row, each slide being moved predetermined distances by each of a plurality of keys in the row thereof, each of said keys moving the slide a distance different from the other keys which move the same slide; a multiplier keyboard with nine digit keys and a zero key; at least one multiplication key near the multiplier board; and a multiplier pin carriage movably mounted near the multiplier keyboard normally at an at-rest position, said pin carriage being moved one space away from its normal position each time a key is depressed in the multiplier board and restoring to its normal position after the machine performs a calculating operation involving the multiplier keyboard; squaring mechanism comprising an auxiliary pin carriage slidably mounted near the selection slides for movement in the direction of movement of the latter and for movement substantially at right angles thereto, a plurality of pins arranged in spaced ordinal rows in the auxiliary carriage, said pins being movable into positions projecting upwardly from the carriage, means connecting the auxiliary carriage to a multiplier pin carriage for movement therewith substantially at right angles to the movement of the slides, a link for each key in the multiplier board mounted for longitudinal movement and terminating adjacent the auiliaxry carriage, means moved by each multiplier key on depression thereof for engaging and longitudinally shifting the link of said key, a pivotally mounted setting key connected to each link and extending beneath the auxiliary carriage, each of said links having a projection extending upwardly beneath a pin of an ordinal row of the auxiliary carriage, each setting key being pivoted by longitudinal movement of its link to raise a pin in the carriage, a solenoid having a core movable therein, means connecting the core to the auxiliary pin carriage, means for energizing the solenoid to move the carriage at right angles to its movement with the multiplier pin carriage, and an arm extending from each selector slide towards the auxiliary carriage, the ends of said arms near the carriage being spaced apart distances equal to the spaces between the rows of pins of the carriage, whereby any raised pins engage arms in line therewith to move the slides connected thereto when the carriage is moved after the multiplication key is depressed.

21. A squaring mechanism for calculating machines as claimed in claim 20 in which the spaced ends of the selector slide arms are arranged in a row extending outwardly from one end of the auxiliary carriage when the latter is in its at-rest position, and the movement of the auxiliary carriage each time it moves with the multiplier carriage is equal to the distance between two arm ends.

22. In a calculating machine having a main keyboard with a plurality of keys arranged in ordinal rows, at least one value selection slide movably mounted beneath each row, each slide being moved predetermined distances by each of a plurality of keys in the row thereof, each of said keys moving the slide a distance different from the other keys which move the same slide; a multiplier keyboard with nine digit keys and a zero key; at least one multiplication key near the multiplier board; and a multiplier pin carriage movably mounted near the multiplier keyboard normally at an at-rest position, said pin carriage being moved one space away from its normal position each time a key is depressed in the multiplier board and restoring to its normal position after the machine performs a calculating operation involving the multiplier keyboard; squaring mechanism comprising a rectangular frame mounted near the selection slides upon tracks extending transversely of said slides, an auxiliary pin carriage slidably mounted on the frame for movement at right angles to the movement of the latter, means connecting the frame to the multiplier pin carriage for movement along the frame tracks each time said carriage moves, a plurality of pins arranged in spaced ordinal rows in the auxiliary carriage, said pins being movable into positions projecting upwardly from the carriage, means extending from each multiplier key for raising a pin in the auxiliary carriage when the key is depressed, a solenoid having a core movable therein, means connecting the core to the auxiliary carriage, means energizing the core to move the carriage in the frame at right angles to the path of movement of the latter and an arm extending from each selector slide towards the auxiliary carriage, the ends of said arms near the carriage being spaced apart distances equal to the spaces between the rows of pins of the carriage and movement of the frame moves pin rows of the carriage into line with arm ends, whereby any raised pins engage arms in line therewith to move the slides connected thereto when the carriage is moved after the multiplication key is depressed.

23. A squaring mechanism as claimed in claim 4 in which each selector slide has a plurality of notches in an upper edge at one end thereof, and including a U-shaped bail pivotally mounted near the selector slides and having a portion which forms the bottom of the U normally resting on the ends of the slides near the notches thereof, said bail bottom dropping into a slide notch when the slide is moved by the auxiliary carriage to hold it in the position to which it is moved, and means for raising the bail bottom out of any slide notch as the pin carriages return to their normal positions.

References Cited in the file of this patent

UNITED STATES PATENTS

| | | |
|---|---|---|
| 1,531,041 | Stinson | Mar. 24, 1925 |
| 1,973,437 | Kottmann | Sept. 11, 1934 |
| 2,102,700 | Gustafsson et al. | Dec. 21, 1937 |
| 2,365,527 | Dennis | Dec. 19, 1944 |
| 2,371,752 | Friden | Mar. 20, 1945 |
| 2,560,910 | Toorell et al. | July 17, 1951 |
| 2,615,633 | Furman et al. | Oct. 28, 1952 |